United States Patent [19]

Theyson

[11] Patent Number: 4,698,165
[45] Date of Patent: Oct. 6, 1987

[54] SHOCK TREATMENT OF AQUEOUS SYSTEMS

[75] Inventor: Thomas W. Theyson, Williamsport, Pa.

[73] Assignee: Glyco Inc., Norwalk, Conn.

[21] Appl. No.: 789,012

[22] Filed: Oct. 18, 1985

[51] Int. Cl.$^4$ .............................................. C02F 1/76
[52] U.S. Cl. .................................. 210/755; 210/756; 210/758; 210/764; 548/311
[58] Field of Search ............... 210/753, 754, 755, 756, 210/758, 764; 424/149; 71/67; 548/311

[56] References Cited

U.S. PATENT DOCUMENTS 2,552,491   5/1951   Marks et al. ........................ 210/755

FOREIGN PATENT DOCUMENTS 1014654   12/1965   United Kingdom ................ 210/764
1327531   8/1973   United Kingdom .

Primary Examiner—Richard V. Fisher
Assistant Examiner—Jeffrey W. Peterson
Attorney, Agent, or Firm—Cushman, Darby & Cushman

[57] ABSTRACT

A process for controlling the formation of undesirable by-products in an aqueous system containing residual halogenated 5,5-dialkyl hydantoins is disclosed. The process comprises the steps of treating the aqueous system with bromide ion and shocking the aqueous medium with free chlorine.

20 Claims, No Drawings

SHOCK TREATMENT OF AQUEOUS SYSTEMS

This invention relates to a process for treating biological growth in aqueous systems. More particularly, the invention relates to a process for the "shock" treatment of aqueous systems such as pools or spas which have been previously disinfected with halogenated 5,5-dialkyl hydantoins.

BACKGROUND OF THE INVENTION

Generally, aqueous systems are kept sparkling clear (e.g. spa or swimming pool water) and uncontaminated by microbiological forms by a combination of the following:
  maintaining the recommended level of disinfectant
  pH contol
  filtration
  maintaining proper chemical balance.

Halogenated 5,5-dialkyl hydantoins have long been known to be effective as disinfectants for aqueous systems such as spas, swimming pools, and industrial recirculating waters etc. For spas and swimming pools, their use is illustrated in U.S. Pat. Nos. 3,346,446 and 3,412,021. Thus, included amongst halogenated 5,5-dialkyl hydantoins commonly used for combatting bacterial growth are 1,3-dichloro-5,5-dimethylhydantoin, 1,3-dibromo-5,5-dimethylhydantoin and mixed bromochloro hydantoins such as 1-bromo-3-chloro-5,5-dimethylhydantoin. Other halogenated 5,5-dialkyl hydantoins which can be used are dihalo derivatives of 5-ethyl-5-methylhydantoin, 5,5-diethylhydantoin, and the like together with blends of these various hydantoins. The phrase "halogenated 5,5-dialkyl hydantoin" as used herein is represented by the formula:

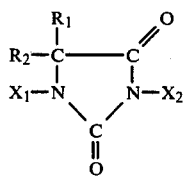

wherein:
  $R_1$, $R_2$ = lower alkyl of 1 to 3 carbons
  $X_1$, $X_2$ = Cl, Br (any combination)

Occasionally, the disinfection process for aqueous systems may be overwhelmed for a variety of reasons - improper control of pH, level of disinfectant residuals, bather loading beyond the capacity of the disinfectant feeder in the case of pools or spas, equipment failure, inattention, etc. Under these circumstances, microbiological growth will proliferate. In the case of industrial systems, heat exchange efficiency may be drastically reduced. In the case of pool and spa systems the water becomes unsightly, and unsafe to use.

The conventional method of overcoming this problem, is to "shock" the system by increasing the free chlorine to a level as high as 5-15 parts per million (ppm), about 10 ppm being typical. The amount of chlorine added is a function of the total organic contaminants in the system. Chlorine is consumed in the degradation of these contaminants and when free and available chlorine is measurable most contamination is removed. At this point, additional chlorine is added to complete the decontamination process and affect disinfection. The final concentration (ppm) of free chlorine may vary from operator to operator, but is usually 5-15 ppm, more often about 10 ppm. In the case of a pool or spa, the free residual is then allowed to drop to less than 5 ppm before use. Thereafter, the pool or spa is usually maintained at about 0.5 to 1.5 ppm of halogen residual. Similar conditions apply to industrial recirculating systems. Thus, as used herein, the term "shocking" is intended to describe such a process. Chlorine sources such as hypochlorite salts, e.g., Ca(OCl)$_2$, NaOCl and the like, are commonly used for such shock treatment.

The use of halogenated 5,5-dialkyl hydantoins in aqueous systems such as a pool or spa will result in the slow buildup of residual partially halogenated or dehalogenated 5,5-dialkyl hydantoins in the system as the halogen is consumed in the disinfection process. It is of practical importance to determine how this residual halogenated 5,5-dialkyl hydantoin affects "shock" treatment of a pool. Petterson and Grzeskowiak in the Journal of Organic Chemistry, 24, 1414–1419 (1959), demonstrated that the initial product formed from 5,5-dimethylhydantoin and active chlorine is a monochlorodimethylhydantoin derivative, e.g.:

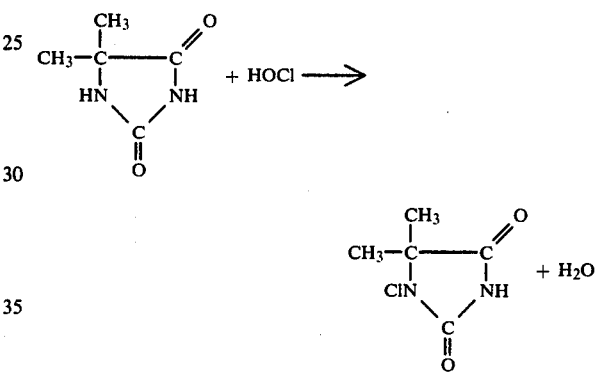

The formation of the monochloro derivative removes the free chlorine in solution needed for disinfection. Further, the monochloro derivative shows minimal biological activity. The result is that the amount of chlorine needed to be added to attain the free chlorine level of about 10 ppm is greatly increased.

Satisfying the demand for chlorine also results in hydantoin ring-opening reactions. Petterson and Grzeskowiak studied the ring-opening reaction of 1,3-dichloro-5,5-dimethylhydantoin in dilute aqueous solutions over the pH range 3-12 and reported the following products:
  1-chloro-5,5-dimethylhydantoin
  carbon dioxide
  nitrogen
  N-chloroisopropylamine
  chloride ion We have also studied the hydrolysis of 1,3-dichloro-5,5-dimethylhydantoin and found that the products of hydrolysis were the same as those found by Petterson and Grzeskowiak with the exception that the product identified by Petterson as N-chloroisopropylamine is actually N-chloroisopropylimine. We have also found that similar chemistry applies for the 5-ethyl-5-methylhydantoin system. Therefore, the results described below for 5,5-dimethylhydantoin (DMH) system are applicable to 5,5-dialkyl hydantoin systems in general.

To illustrate how the halogenated 5,5-dialkyl hydantoins in aqueous solution affect shock treatment, a series of experiments were carried out varying the the levels of both dimethyl hydantoin (DMH) and chlorine added to solution at pH 7.5 and 40° C. (spa conditions). The data given in Table I illustrates that residual DMH leads to the following results:

(1) DMH is converted to monochloro DMH (based on the observed difference between free and total chlorine levels), (2) ring-opening reactions take place, generating N-chloroisopropylimine and acetone, (3) high levels of hypochlorite are required to attain the desired free chlorine level of about 10 ppm: 20 ppm of residual DMH requried 45 ppm of hypochlorite, and 40 ppm of residual DMH requried 69 ppm of hypochlorite.

A further object of the invention is to provide a shock treatment where the amount of chlorine necessary to shock the pool is reduced.

SUMMARY OF THE INVENTION

The foregoing objects of the invention are achieved by a process where water containing residual hydantoin is treated with a small amount of bromide ion. Thus, according to the invention, water containing residual halogenated 5,5-dialkyl hydantoin is treated with a small amount of bromide ion. With the addition of the bromide ion, the amount of chlorine necessary to obtain a free chlorine level of about 10 ppm (level recommended for shock treatments) is greatly reduced.

The method of the present invention reduces the concentration of monochloro 5,5-dialkyl hydantoins and eliminates N-chloroimines in the treated system.

TABLE I

Shock Treatment of Halogenated 5,5-dialkyl Hydantoin Solutions

| Solution | DMH[1] ppm | Chlorine[2] added ppm | Moles Chlorine[2] per mole DMH | Chlorine[2], ppm Free | Chlorine[2], ppm Total | N—chloroiso- propylimine ppm | Acetone ppm |
|---|---|---|---|---|---|---|---|
| A | 0 | 10 | — | 8 | 10 | NM[3] | NM |
| B | 20 | 10 | 0.92 | 0.4 | 7 | ND[4] | ND |
| C | 40 | 10 | 0.46 | 0.4 | 7 | ND | ND |
| D | 100 | 10 | 0.18 | 0.8 | 8 | ND | ND |
| E | 20 | 20 | 1.83 | 1.5 | 12 | 2.2 | 1.1 |
| F | 40 | 20 | 0.92 | 0.9 | 16 | ND | ND |
| G | 100 | 20 | 0.37 | 0.8 | 16 | ND | ND |
| H | 20 | 30 | 2.75 | 2.2 | 12 | 3.8 | 1.5 |
| I | 40 | 30 | 1.37 | 1.2 | 16 | 2.1 | 1.1 |
| J | 100 | 30 | 0.55 | 1.2 | 26 | ND | ND |
| K | 20 | 45 | 4.1 | 12 | 26 | 5.2 | 2.4 |
| L | 40 | 69 | 3.1 | 10 | 26 | 9.4 | 2.2 |

[1]DMH = 5,5-dimethylhydantoin
[2]HOCl added, expressed as available chlorine ($Cl_2$)
[3]NM = Not Measured
[4]ND = Not Detected While not wishing to limit the present invention, we believe that the acetone results from hydrolysis of a portion of the N-chloroisopropylimine:

$$\begin{array}{c}CH_3 \\ \phantom{x} \\ CH_3\end{array}\!\!\!\!C=NCl \xrightarrow{\text{hydrolysis}} \begin{array}{c}CH_3 \\ \phantom{x} \\ CH_3\end{array}\!\!\!\!C=O$$

We have also found that ketones are present in aqueous systems disinfected with HOCl in the absence of halogenated 5,5-dialkyl hydantoin disinfectants from the oxidation of organic substances by active halogen, and thus are not associated only with hydantoin-based disinfectants.

The N-chloroisopropylimine is, however, specific to the DMH system. N-chloroisopropylimine is a material that consumes active halogen in being generated, is not microbicidally active, has a sharp, halogen-like odor, is an irritant, and is toxic.

Overall, then, it is a general object of the invention to provide a process which prevents the formation of the toxic N-chloroimines and hydantoin ring-opening by-products thereby minimizing user risks in such applications as spas and pools.

It is a further object of the invention to provide a process which will repress the formation of monochloro-5,5-dialkyl hydantoins which cause lower biological activity and whose toxicity is unknown.

It is a further object of the invention to provide a process which optimizes the efficient utilization of chlorine by reducing undesirable by-product formation.

DETAILED DESCRIPTION OF THE INVENTION

The problems associated with the "shock" treatment of aqueous systems such as pool water containing residual halogenated 5,5-dialkyl hydantoin can be avoided by the addition of a small amount of bromide ion (bromide salts) to the aqueous system being "shock" treated.

Advantageously, the bromide ion is distributed throughout the system before the system is "shocked" with a chlorine source. The bromide ion is added to the system to obtain a bromide ion concentration of from about 15–30 ppm, advantageously about 20 ppm. If desired, one may initially add greater amounts than 15–30 ppm of bromide ion, e.g. as much as 100 ppm or more, before the chlorine source is added. This method would avoid repetitive addition of bromide ion to the aqueous system for subsequent shocking, at least until the bromide ion concentration falls below the desired range of from about 15 to about 30 ppm.

Hypochlorite ion converts all of the bromide ion added to hypobromite. The hypobromite formed is a more potent biocide than hypochlorite. When adding such high amounts of bromide ion to the system, one may shock the system a number of times before addition of further bromide ion is needed. What is important is that when the chlorine source is added to "shock" the system, the necessary amount of bromide ion be present.

As shown below, the problems of monochloro 5,5-dialkyl hydantoin and N-chloromine formation are completely eliminated by adding about 20 ppm of sodium bromide (0.21 lbs. NaBr/1,000 gallons) to the aqueous system before being "shocked" by the addition of a chlorine source, e.g. hypochlorite. The halogen is not consumed by the formation of inactive species. High concentrations of free chlorine are obtained with a low $Cl_2$/5,5-dialkyl hydantoin ratio as shown in Table II.

TABLE II

| Solution | DMH ppm | Chlorine[1] added ppm | Bromide ppm | Moles Chlorine[1] per mole of 5,5-dialkyl hydantoin | Chlorine[2], ppm | | N—chloroiso-propylimine ppm | Acetone ppm |
|---|---|---|---|---|---|---|---|---|
| | | | | | Free | Total | | |
| A | 20 | 30 | 6.0 | 2.75 | 3 | 14 | 4.8 | 2.4 |
| B | 20 | 18 | 20.0 | 1.64 | 10 | 13 | ND[3] | 4.9 |
| C | 40 | 18 | 20.0 | 0.82 | 11 | 13 | ND | 3.8 |
| D | 100 | 18 | 20.0 | 0.33 | 11 | 13 | ND | 2.4 |
| E | 100 | 30 | 30.0 | 0.55 | 17 | 22 | ND | 4.3 |
| F | 40 | 30 | 12.0 | 1.37 | 7 | 20 | 0.6 | 0.5 |

[1]HOCl added, expressed as available chlorine ($Cl_2$)
[2]Halogen expressed as available chlorine ($Cl_2$)
[3]ND = Not Detected Table II also shows that if a pool is "shocked" to provide as much as 17 ppm of free chlorine (Item E) the amount of combined inactive chlorine is drastically reduced (compare to Item J, Table I). The same results are observed at either low or high concentrations of 5,5-dialkyl hydantoin (compare B, C and D), i.e., the results are not a function of the free 5,5-dialkyl hydantoin concentration.

The amount of halogen required to attain the needed free chlorine level of about 10 ppm is reduced substantially with the addition of at least from about 15 to about 30 ppm, and preferably about 20 ppm bromide ion. Comparing Tables I and II, where 20 ppm of residual 5,5-dialkyl hydantoin is present, the amount of chlorine required is reduced from 45 ppm to 18 ppm. In the presence of 40 ppm residual 5,5-dialkyl hydantoin, the amount of chlorine required is reduced from 69 ppm to 18 ppm.

Suitable sources to provide the requisite free chlorine include free chlorine, hypochlorite salts (e.g. calcium hypochlorite) and like materials.

In the presence of sufficient bromide ion, the monochloro 5,5-dialkyl hydantoin is unstable because of the oxidative effect of the chlorine on the bromide ion, i.e.:

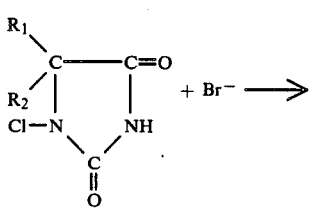

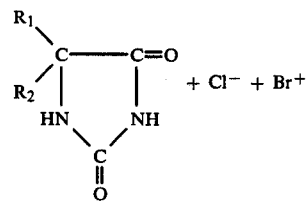

Since monobromo 5,5-dialkyl hydantoins are more readily dissociated on demand, obtaining the desired active halogen concentration of about 10 ppm (as $Cl_2$) would require less hypochlorite.

When sodium bromide is present, some unstable N-bromoimine forms which, in turn, immediately hydrolyzes to ketone.

While not wishing to limit the present invention, we believe that the reaction mechanism is as follows:

Step 1

Generation of Hypobromous Acid $NaBr + HOCl \rightarrow HOBr + NaCl$

Step 2

Ring-Opening

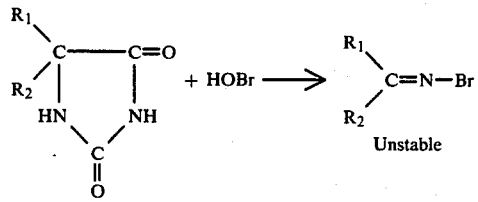

Step 3

Hydrolysis of N-bromoimine (RAPID)

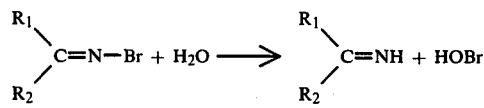

Step 4

Hydrolysis of Imine (RAPID)

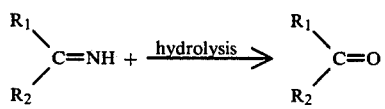

Because N-bromoiminres are unstable, their transient presence is evidenced only by the existence of ketone, the hydrolysis product. The presence of sufficient $Br^-$ eliminates the possibility of generating N-chloroimines.

In view of the exemplary embodiments of the present invention described in detail above, those skilled in the art will readily appreciate that many modifications are possible to the exemplary embodiments without materially departing from the novel teachings and advantages of this invention. Accordingly, all such modifications are intended to be included within the scope of this invention as defined in the following claims.

What is claimed is:

1. A process for the shock treatment of an aqueous system, said system having previously been treated with a dihalo 5,5-dialkyl hydantoin so as to control biological growth and resulting in an undesirable buildup of residual 5,5-dialkyl hydantoins, which comprises: adding a source of chlorine so as to increase the free chlorine level of said aqueous system to form about 5 to about 15 ppm in the presence of a sufficient amount of bromide ion to prevent the formation of monochloro-5,5-dialkyl hydantoins, and the subsequent degradation to N-chloroimines, as chlorine is added to the system.

2. A process as in claim 1 wherein the sufficient amount of bromide ion is achieved by adding bromide salts to the aqueous system.

3. A process as in claim 1 wherein said bromide ion is added to the aqueous system before the source of chlorine is added to obtain a bromide ion concentration of about 15–30 ppm.

4. A process as in claim 3 wherein said bromide ion is added to the aqueous system to obtain a bromide ion concentration of about 20 ppm.

5. A process as in claim 3 wherein the bromide ion is added in the form of sodium bromide to the aqueous system to obtain a bromide ion concentration of about 15–30 ppm.

6. A process as in claim 5 wherein the sodium bromide is added to the aqueous system to obtain a bromide ion concentration of about 20 ppm.

7. A process as in claim 1 wherein the chlorine source is a hypochlorite.

8. A process as in claim 1 wherein the chlorine source is free chlorine.

9. A process as in claim 8 wherein the free chlorine is added until it reaches the concentration of about 5–15 ppm.

10. A process as in claim 9 wherein the free chlorine is added until it reaches the concentration of about 10 ppm.

11. A process for preventing the generation of N-chlorimines in an aqueous system which has been disinfected with dihalo 5,5-dialkyl hydantoins comprising: adding bromide ion to the aqueous system prior to the addition of free chlorine to said system in an amount sufficient to prevent the formation of N-chloroimines as chlorine is added to the system.

12. A process as in claim 11 wherein the source of bromide ion is a bromide salt.

13. A process as in claim 11 wherein the bromide ion is added to the aqueous system to obtain a bromide ion concentration of about 15–30 ppm.

14. A process as in claim 13 wherein the bromide ion is added to the aqueous system to obtain a bromide ion concentration of about 20 ppm.

15. A process as in claim 13 wherein the source of bromide ion is sodium bromide which is added to the aqueous system to obtain a bromide ion concentration of about 15–30 ppm.

16. A process as in claim 15 wherein the sodium bromide is added to obtain a bromide ion concentration of about 20 ppm.

17. A process as in claim 11 wherein the source of free chlorine is hypochlorite.

18. A process as in claim 11 wherein the free chlorine is added until it reaches the concentration of about 5–15 ppm.

19. A process as in claim 18 wherein the free chlorine is added until it reaches the concentration of about 10 ppm.

20. A process for the shock treatment of a pool or spa, said pool or spa having been previously treated with a dihalo 5,5-dialkylhydantoin, so as to control biological growth, resulting in the buildup of residual 5,5-dialkylhydantoins, which comprises: adding a source of chlorine so as to increase the free chlorine level of said pool or spa to 5–15 ppm in the presence of 15–30 ppm of bromide ion, wherein the formation of monochloro-5,5-dialkylhydantoins and the subsequent degradation to N-chloroimines, as chlorine is added to the system, is prevented.

* * * * *